Figure 5:
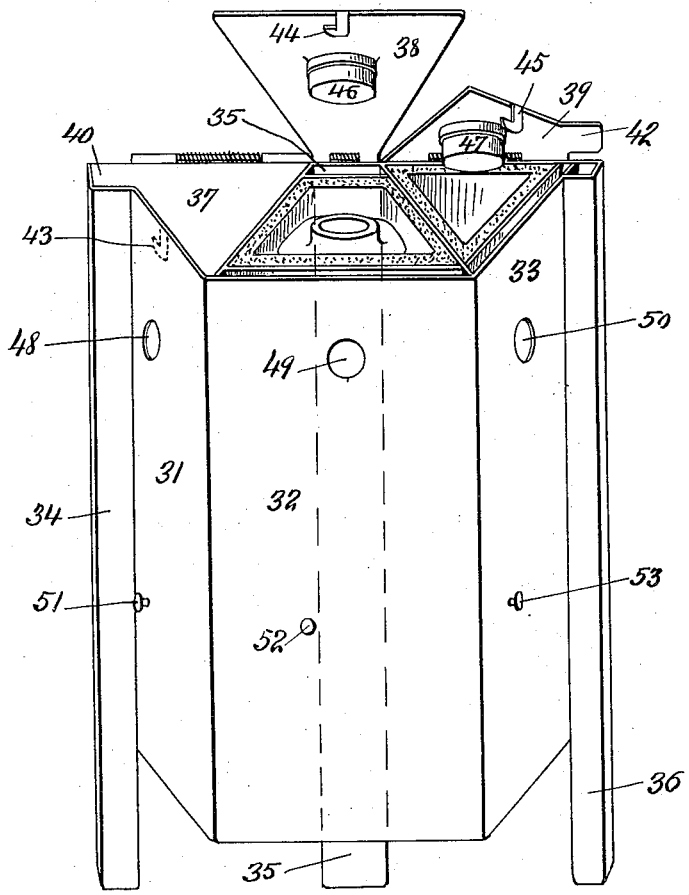

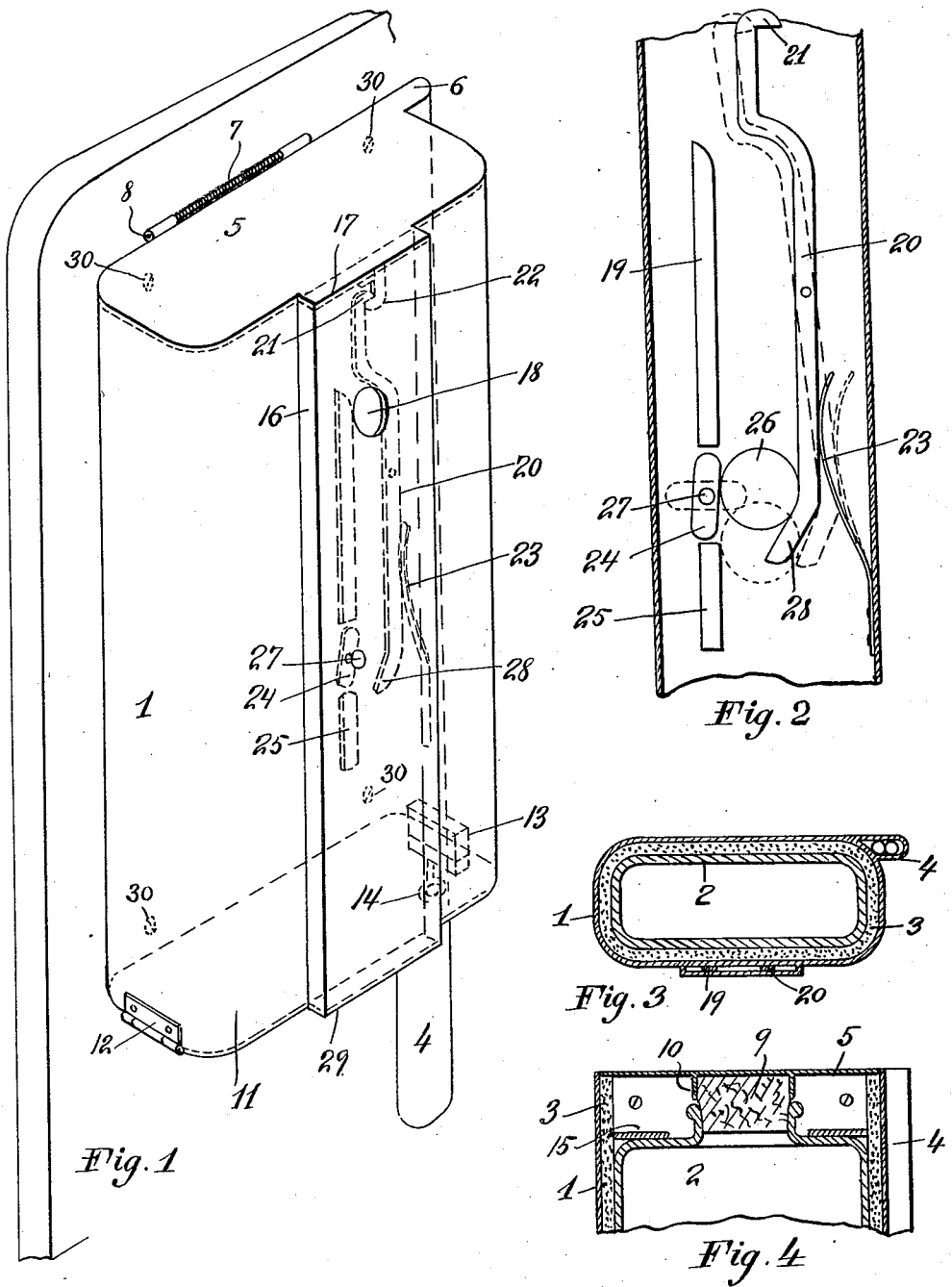

L. G. MURNIN.
APPARATUS FOR VENDING INDIVIDUAL DRINKS.
APPLICATION FILED SEPT. 28, 1909.

1,017,788.

Patented Feb. 20, 1912.

2 SHEETS—SHEET 2.

UNITED STATES PATENT OFFICE.

LESLIE G. MURNIN, OF NEW YORK, N. Y.

APPARATUS FOR VENDING INDIVIDUAL DRINKS.

1,017,788.   Specification of Letters Patent.   Patented Feb. 20, 1912.

Application filed September 28, 1909. Serial No. 519,935.

*To all whom it may concern:*

Be it known that I, LESLIE G. MURNIN, a citizen of Australia, and a resident of New York city, New York, have invented certain new and useful Improvements in Apparatus for Vending Individual Drinks, of which the following is a specification.

My invention relates to coin controlled apparatus for dispensing individual drinks which apparatus is secured to the back of a seat, such as a theater chair, for the purpose of delivering an individual cool drink of a suitable beverage, such as milk or an alcoholic drink.
One of the objects of my invention is to provide an individual drink dispensing device with a removable vessel, such as a bottle, adapted to contain a cool drink and provided with means for preventing the heat of the theater or building from being communicated to the contents of the vessel, thus maintaining the contents at a substantially fixed temperature and making them palatable.
Another object of my invention is to provide means for imbibing the contents of the bottle without removing it from the receptacle and without attracting attention which would tend to destroy the utility of the apparatus, the bottle being removable for the purpose of filling and cleaning.

Another object of my invention is to provide a simple improved construction of coin controlled apparatus for dispensing individual drinks which can be cheaply made, is reliable in operation, which can be secured to a theater seat without being liable to removal by unauthorized persons, which will supply a clean sanitary drink, at the same time providing sanitary means for imbibing the drink, which last named means is protected from unauthorized use or handling.

With the above and other objects in view my invention consists in the parts, improvements, and combinations more fully pointed out hereafter.

Referring now to the drawings which are attached to this specification and form a part thereof, Figure 1 is a perspective view of one embodiment of the invention showing the casing, with certain parts of the coin controlled mechanism indicated in dotted lines. Fig. 2 is a sectional view showing the coin controlled mechanism. Fig. 3 is a transverse sectional view through the casing, the bottle and the straw chamber. Fig. 4 is a detail, longitudinal section through the cover of the casing. Fig. 5 is a view of another embodiment of the invention in which a plurality of receptacles is used.

The receptacle 1 is constructed so as to adapt it to contain a removable vessel, which in the particular embodiment of the invention illustrated takes the form of a bottle 2. Suitable means are provided for maintaining the contents of the vessel at a substantially fixed temperature and to avoid the objection that the liquid in the bottle might become unduly heated or cooled by abstracting from or imparting heat to the atmosphere, which would make the contents unpalatable. I provide insulating means which is interposed between the vessel and the receptacle for maintaining the contents of the vessel at a substantially fixed temperature. In the particular embodiment of the invention illustrated this insulating means consists of an insulating lining 3 which is preferably permanently secured to the casing 1.

Suitable means are provided for imbibing the contents of the vessel without attracting attention and in a sanitary manner. In the particular embodiment of the invention illustrated I make use of a chamber 4 adapted to contain straws, which chamber as shown is secured to the receptacle. Means are also provided for preventing unauthorized access to the vessel containing the liquid and to the straws. It is particularly desirable to provide such a means as otherwise the straws would be taken from their chamber and destroyed or made unsanitary by handling. I therefore provide a cover for the receptacle and a cover for the chamber containing the straws, and in the particular embodiment of the invention illustrated I connect the covers together, which secures simplicity of construction and enables me to use a single coin controlled means for locking both covers closed. The cover for the receptacle containing the bottle is numbered 5 and that for the straw chamber is numbered 6. Suitable means are provided for opening the covers, when the coin controlled mechanism is operated. As illustrated I make use of a spring 7 surrounding the hinge rod 8, the spring being attached to the cover, to accomplish this result. I also preferably provide means carried by the cover for closing the mouth of the vessel, which means may take the form of a cork 9 secured to the cover 5 by the holder 10.

Suitable means are provided for making the vessel, for example the bottle, removable for the purpose of filling it and for cleaning. In the particular embodiment of the invention illustrated I provide the receptacle 1 with a movable bottom 11 which may be hinged at 12 to form a pivot for it and which may be locked closed by a lock 13 operated by a key 14. The bottle may therefore be readily inserted into the receptacle and removed therefrom, by the attendant. After it has been inserted in place it is prevented from unauthorized removal by providing a stop 15 for the top of the bottle or vessel.

Coin controlled means are provided, which may be widely varied, for locking the covers closed. In the embodiment of the invention illustrated I make use of a coin chamber 16, closed at the top by a cover 17, which is attached to the cover 5. A coin opening 18 is made in the coin chamber, the opening being located directly in front of the apparatus, in plain view. The coin chamber contains a guide 19 forming one side of the coin chute and a pivoted lever 20 forming the other side, a catch 21 being connected with the pivot lever 20, said catch engaging a hook 22 which in turn is secured to the cover 5. A spring 23 presses the lever 20 in the direction indicated. A coin operating arm 24 is mounted at the lower end of the coin chute, the chute being prolonged by a guide 25 which guides the coin 26 to the bottom of the coin chamber. A handle 27 is secured to the arm 24, whereby the arm may be turned. The lower end of the lever 20 is provided with an angular projection 28 to engage the coin. When the arm 24 is turned, with the coin in the position indicated in Fig. 2, the lever 20 is forced to one side, releasing the cover 5 and allowing the spring to open. The coin chamber is closed at its lower end by a plate 29 attached to the bottom 11.

Means are provided to prevent removal of the apparatus from the theater by unauthorized persons. In the particular embodiment of the invention illustrated I provide screw holes 30, whose openings are arranged within the receptacle 1 and near the covers 5 and bottom 11. The apparatus can thus be screwed into place, by opening the covers, but the apparatus cannot be removed by an unauthorized person, when the bottom 11 is locked shut.

Referring now to the embodiment of the invention illustrated in Fig. 5, a plurality of receptacles is provided so that different drinks may be dispensed. The number of these receptacles may be varied, 3 being illustrated. They are secured together and each receptacle is provided with a corresponding straw chamber. The receptacles are numbered 31, 32, 33 respectively and the straw chambers 34, 35 and 36. In the best embodiment of this form of the invention I make use of a plurality of covers 37, 38 and 39, one for each receptacle and a plurality of covers 40 and 42, one for each straw chamber, the covers being secured together. The covers are provided with hooks 43, 44 and 45 and with means for closing the mouth of the bottles contained in the receptacles which means may consist of corks 46 and 47. Suitable coin openings 48, 49, 50 and coin operating handles 51, 52 and 53 are used to control the coin operating mechanism which mechanism may take the form of that shown in Fig. 1 and is not illustrated in Fig. 5.

Having thus described the construction of my invention, its operation will be readily understood. The bottle containing the liquid to be dispensed which has been cooled, if it is to be used in summer, or heated if desired in winter is inserted into the receptacle and the bottom locked just before the audience enters the theater. By inserting a coin in the coin opening and operating the handle, the cover opens and a straw may be removed from the straw chamber, inserted into the bottle and the drink imbibed. The contents of the bottle are so gaged that one individual drink only is supplied for each coin.

Having thus described the principle of my invention, it will be apparent that changes may be made without departing from the principle and without sacrificing its chief advantages.

What I claim and desire to secure by Letters Patent is:

1. In a vending apparatus for dispensing liquids, the combination of a receptacle adapted to contain a liquid container, a cover for the receptacle for giving access to the liquid container, a long narrow chamber adapted to contain straws, a movable bottom for said receptacle adapted to permit insertion and removal of the liquid container and means for locking said cover closed.

2. In a vending apparatus for dispensing liquids, the combination of a receptacle adapted to contain a removable vessel, a pivoted cover for the receptacle, means carried by the cover for closing the mouth of the vessel, a chamber secured to the receptacle and adapted to contain straws, a cover for said chamber integral with the receptacle cover, a spring for opening said covers, a pivoted bottom for said receptacle, a lock for said bottom, and means for locking said covers closed.

3. In a vending apparatus for dispensing liquids the combination of a plurality of receptacles secured together, a plurality of chambers, each chamber adapted to contain straws and each chamber secured to a corresponding receptacle, a plurality of covers one for each receptacle, a plurality of covers one for each straw chamber, said covers being secured together and a plurality of mechanisms, one for each receptacle cover, for locking said covers closed.

4. In a vending apparatus for dispensing liquids, the combination of a receptacle adapted to contain a removable liquid container, a cover for the receptacle for giving access to said liquid container, an insulating lining for the receptacle, a movable bottom for the receptacle adapted to permit insertion and removal of the liquid container, and means for preventing the removal of the apparatus from a support comprising securing means located within the receptacle and adjacent to said bottom.

5. In a vending apparatus for dispensing liquids, the combination of a receptacle adapted to contain a removable vessel, a cover for the receptacle, a stop for preventing removal of the vessel from the receptacle, a movable bottom for the receptacle, a lock for the bottom and mechanism for locking said cover closed.

In testimony whereof, I have signed my name to this specification, in the presence of two subscribing witnesses.

LESLIE G. MURNIN.

Witnesses:
W. C. MARGESON,
WM. F. BISSING.

---

Copies of this patent may be obtained for five cents each, by addressing the "Commissioner of Patents, Washington, D. C."